US010162812B2

(12) United States Patent
Pradhan et al.

(10) Patent No.: US 10,162,812 B2
(45) Date of Patent: Dec. 25, 2018

(54) NATURAL LANGUAGE PROCESSING SYSTEM TO ANALYZE MOBILE APPLICATION FEEDBACK

(71) Applicant: Bank of America Corporation, Charlotte, NC (US)

(72) Inventors: Satyabrata Pradhan, Hyderabad (IN); Sunil Bhashetty, Hyderabad (IN); Raja Venkatesh Gottumukkala, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/478,769

(22) Filed: Apr. 4, 2017

(65) Prior Publication Data

US 2018/0285345 A1 Oct. 4, 2018

(51) Int. Cl.
*G06F 17/27* (2006.01)
*G10L 15/26* (2006.01)

(52) U.S. Cl.
CPC ........ *G06F 17/2785* (2013.01); *G06F 17/274* (2013.01); *G06F 17/2705* (2013.01); *G06F 17/2735* (2013.01); *G10L 15/265* (2013.01)

(58) Field of Classification Search
CPC ...................................................... G06F 17/02
USPC .......................... 704/1, 9, 10, 257, 270–275
See application file for complete search history.

(56) References Cited

U.S. PATENT DOCUMENTS

| 7,197,459 | B1 * | 3/2007 | Harinarayan .. G06Q 10/063112 704/270 |
| 8,239,189 | B2 | 8/2012 | Skubacz et al. |
| 8,356,025 | B2 | 1/2013 | Cai et al. |
| 8,676,730 | B2 | 3/2014 | Ghani et al. |
| 8,868,471 | B1 * | 10/2014 | Hullender .......... G06K 9/00671 706/12 |

(Continued)

OTHER PUBLICATIONS

"Natural language processing," from Wikipedia, the free encyclopedia, accessed Apr. 4, 2017 from https://en.wikipedia.org/wiki/Natural_language_processing, 7 pages.

(Continued)

*Primary Examiner* — Jesse S Pullias
(74) *Attorney, Agent, or Firm* — Banner & Witcoff, Ltd.; Michael A. Springs

(57) ABSTRACT

Aspects of the disclosure relate to using a natural language processing system to analyze mobile application feedback. A computing platform having at least one processor, a memory, and a communication interface may receive mobile application feedback information comprising text feedback associated with feedback of a mobile application. The computing platform may identify one or more nouns associated with the text feedback. The computing platform may identify one or more text feedback topics. The computing platform may generate one or more commands directing a sentiment analysis server to determine one or more sentiments for the one or more text feedback topics. The computing platform may transmit the one or more commands directing the sentiment analysis server to determine the one or more sentiments. The computing platform may receive the one or more sentiments. The computing platform may transmit the feedback topics and the one or more sentiments.

20 Claims, 9 Drawing Sheets

(56) References Cited

U.S. PATENT DOCUMENTS

| | | | |
|---|---|---|---|
| 2005/0114131 A1* | 5/2005 | Stoimenov | G10L 15/26 704/251 |
| 2007/0282814 A1* | 12/2007 | Gupta | G06F 17/27 |
| 2008/0249764 A1 | 10/2008 | Huang et al. | |
| 2013/0262114 A1* | 10/2013 | Brockett | G10L 15/22 704/243 |
| 2014/0039870 A1* | 2/2014 | Roy | G06F 17/2854 704/2 |
| 2017/0004205 A1* | 1/2017 | Jain | G06F 17/30011 |
| 2017/0091466 A1 | 3/2017 | Meyer et al. | |
| 2017/0091532 A1 | 3/2017 | Son et al. | |
| 2017/0091534 A1 | 3/2017 | Venkataraman et al. | |
| 2017/0091589 A1 | 3/2017 | Gulwani et al. | |
| 2017/0091612 A1 | 3/2017 | Gruber et al. | |
| 2017/0091628 A1 | 3/2017 | Nachman et al. | |
| 2017/0091629 A1 | 3/2017 | Li et al. | |
| 2017/0091632 A1 | 3/2017 | Sanchez et al. | |
| 2017/0091659 A1 | 3/2017 | Sanchez et al. | |
| 2017/0091660 A1 | 3/2017 | Sanchez et al. | |
| 2017/0091661 A1 | 3/2017 | Sanchez et al. | |
| 2017/0091662 A1 | 3/2017 | Sanchez et al. | |
| 2017/0091663 A1 | 3/2017 | Sanchez et al. | |
| 2017/0091664 A1 | 3/2017 | Sanchez et al. | |
| 2017/0091665 A1 | 3/2017 | Sanchez et al. | |
| 2017/0091678 A1 | 3/2017 | Ko et al. | |
| 2017/0091689 A1 | 3/2017 | Elliott | |
| 2017/0091713 A1 | 3/2017 | Paris | |
| 2017/0091717 A1 | 3/2017 | Chandraghatgi et al. | |
| 2017/0091756 A1 | 3/2017 | Stern et al. | |
| 2017/0091845 A1 | 3/2017 | Robinson et al. | |
| 2017/0091847 A1 | 3/2017 | Cama et al. | |
| 2017/0091866 A1 | 3/2017 | Donahue et al. | |
| 2017/0091883 A1 | 3/2017 | Greystoke et al. | |
| 2017/0092007 A1 | 3/2017 | Goldberg et al. | |
| 2017/0092099 A1 | 3/2017 | Walker et al. | |
| 2017/0092106 A1 | 3/2017 | Cameron | |
| 2017/0092151 A1 | 3/2017 | Xi et al. | |
| 2017/0092247 A1 | 3/2017 | Silverstein | |
| 2017/0092259 A1 | 3/2017 | Jeon | |
| 2017/0092270 A1 | 3/2017 | Newendorp et al. | |
| 2017/0092275 A1 | 3/2017 | Chang et al. | |
| 2017/0092278 A1 | 3/2017 | Evermann et al. | |
| 2017/0092325 A1 | 3/2017 | Axen et al. | |
| 2017/0093105 A1 | 3/2017 | Belinksky et al. | |
| 2017/0093210 A1 | 3/2017 | Recker et al. | |
| 2017/0093276 A1 | 3/2017 | Paul et al. | |
| 2017/0093434 A1 | 3/2017 | Greenebaum et al. | |
| 2017/0093471 A1 | 3/2017 | Murakami et al. | |
| 2017/0093569 A1 | 3/2017 | Roth et al. | |
| 2017/0093590 A1 | 3/2017 | Chinnapatlolla et al. | |
| 2017/0093750 A1 | 3/2017 | McBride et al. | |
| 2017/0093774 A1 | 3/2017 | Arastafar et al. | |
| 2017/0093848 A1 | 3/2017 | Poisner et al. | |
| 2017/0093870 A1 | 3/2017 | Meyer | |
| 2017/0093910 A1 | 3/2017 | Gukal et al. | |
| 2017/0093931 A1 | 3/2017 | Chinnapatlolla et al. | |
| 2017/0093981 A1 | 3/2017 | Cameron | |
| 2017/0093982 A1 | 3/2017 | Shaashua et al. | |
| 2017/0094672 A1 | 3/2017 | Yerramalli et al. | |

OTHER PUBLICATIONS

"Dialog System," from Wikipedia, the fee encyclopedia, accessed Apr. 4, 2017 from https://en.wikipedia.org/wiki/Dialog_system, 5 pages.

* cited by examiner

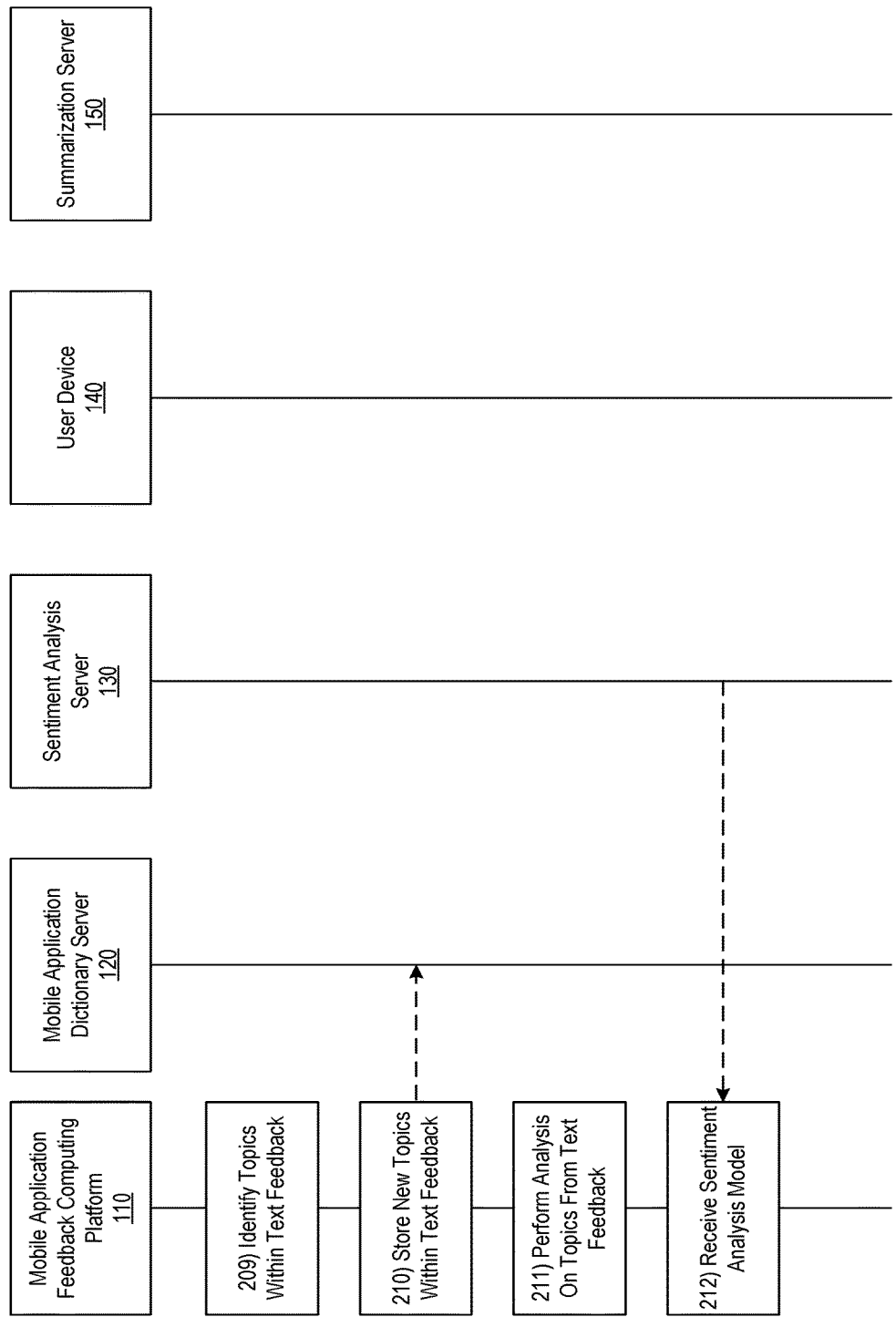

NATURAL LANGUAGE PROCESSING SYSTEM TO ANALYZE MOBILE APPLICATION FEEDBACK

BACKGROUND

Aspects of the disclosure relate to data processing, speech signal processing, word recognition, specialized models, and natural language. In particular, one or more aspects of the disclosure relate to analyzing mobile application feedback using a natural language processing system.

In some instances, after using a mobile application, a system may receive user feedback about the mobile application. For example, after using a mobile application, a user may give user feedback about the mobile application. However, the user feedback may include grammatical errors and/or spelling errors. Further, the user feedback may describe many different features and/or sentiments associated with the mobile application. Thus, the system may have difficulty recognizing important elements of the user feedback. Additionally, or alternatively, the system may have difficulty identifying interconnections between words and/or sub-portions of words within the user feedback.

SUMMARY

Aspects of the disclosure provide effective, efficient, scalable, and convenient technical solutions that address and overcome the technical problems associated with analyzing mobile application feedback using a natural language processing system.

In accordance with one or more embodiments, a computing platform having at least one processor, a memory, and a communication interface may receive, by the at least one processor, via the communication interface, and from a first user device, mobile application feedback information comprising text feedback associated with feedback of a mobile application. Thereafter, the computing platform may identify, based on the text feedback, one or more nouns associated with the text feedback. Then, the computing platform may identify, based on a comparison between the one or more nouns with a plurality of topics associated with the mobile application, one or more text feedback topics. Subsequently, the computing platform may generate, based on the one or more text feedback topics, one or more commands directing a sentiment analysis server to determine one or more sentiments for the one or more text feedback topics. Next, the computing platform may transmit, via the communication interface and to the sentiment analysis server, the one or more commands directing the sentiment analysis server to determine the one or more sentiments. Then, the computing platform may receive, via the communication interface and from the sentiment analysis server, the one or more sentiments. Afterwards, the computing platform may transmit, via the communication interface and to a summarization server, the one or more text feedback topics and the one or more sentiments.

In some embodiments, the computing platform may modify, using a lemmatization analysis technique, the text feedback to generate cleansed text feedback. Subsequently, the one or more nouns associated with the text feedback may be identified based on the cleansed text feedback.

In some embodiments, the computing platform may receive, via the communication interface and from a mobile application dictionary server, the plurality of mobile application topics associated with the mobile application. Afterwards, the identifying the one or more text feedback topics may be based on the one or more nouns matching the plurality of mobile application topics associated with the mobile application.

In some embodiments, responsive to the one or more nouns not matching the plurality of mobile application topics, the computing platform may determine a frequency of user feedback associated with the one or more nouns and a time period associated with the one or more nouns. Subsequently, the computing platform may identify, based on the frequency of user feedback and the time period, new mobile application topics associated with the mobile application.

In some embodiments, the computing platform may modify the plurality of mobile application topics associated with the mobile application to include the new mobile application topics. Subsequently, the computing platform may transmit, via the communication interface and to the mobile application dictionary server, the plurality of modified mobile application topics.

In some embodiments, in generating one or more commands directing the sentiment analysis server to determine the one or more text feedback topics, the computing platform may determine, based on performing sentiment analysis on a part of the text feedback associated with the one or more text feedback topics, the one or more sentiments for the one or more text feedback topics. Afterwards, the computing platform transmitting the one or more sentiments for the one or more text feedback topics.

In some embodiments, in determining the one or more sentiments, the computing platform may extract, based on using a natural language processing based dependency parser, the part of the text feedback associated with the one or more text feedback topics. Subsequently, the computing platform may determine the one or more sentiments from the part of the text feedback associated with the one or more text feedback topics.

In some embodiments, in determining the one or more sentiments, the computing platform may receive a sentiment analysis model comprising past recorded user feedback data. Subsequently, the computing platform may determine, based on a comparison between the sentiment analysis model and the part of the text feedback associated with the one or more text feedback topics, the one or more sentiments and one or more score probabilities associated with the one or more sentiments.

In some embodiments, the determining the one or more score probabilities is based on similarities between the part of the text feedback associated with the one or more text feedback topics and phrases within the sentiment analysis model.

In some embodiments, the mobile application feedback information may comprise a voice recording associated with feedback of the mobile application. Subsequently, the computing platform may generate the text feedback from the voice recording.

In some embodiments, the computing platform may receive, by the at least one processor, via the communication interface, and from a plurality of user devices, second mobile application feedback information comprising a plurality of text feedback associated with the feedback of the mobile application. Thereafter, the computing platform may identify, based on the plurality of text feedback, a plurality of nouns associated with the plurality of text feedback. Then, the computing platform may identify, based on a comparison between the plurality of nouns with the plurality of mobile application topics associated with the mobile application, a plurality of text feedback topics. Subsequently, the computing platform may generate, based on the plurality of text feedback topics, one or more commands directing the sentiment analysis server to determine a plurality of sentiments for the plurality of text feedback topics. Next, the computing platform may transmit, via the communication interface and to the sentiment analysis server, the one or more commands directing the sentiment analysis server to determine the plurality of sentiments, wherein each of the plurality of sentiments corresponds to a text feedback topic from the plurality of text feedback topics. Then, the computing platform may receive, via the communication interface and from the sentiment analysis server, the plurality of sentiments. Afterwards, the computing platform may transmit, via the communication interface and to the summarization server, the plurality of text feedback topics and the plurality of sentiments.

In some embodiments, the computing platform may aggregate the plurality of text feedback topics and the plurality of sentiments. Subsequently, the computing platform may determine one or more extracted comments from the text feedback associated with popular user feedback comments corresponding to the mobile application. Afterwards, the computing platform may generate, based on the aggregated plurality of text feedback topics, the aggregated plurality of sentiments, and the one or more extracted comments, a report associated with the second mobile application feedback information. Next, the computing platform may transmit, via the communication interface and to the summarization server, the report.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for analyzing mobile application feedback using a natural language processing system in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
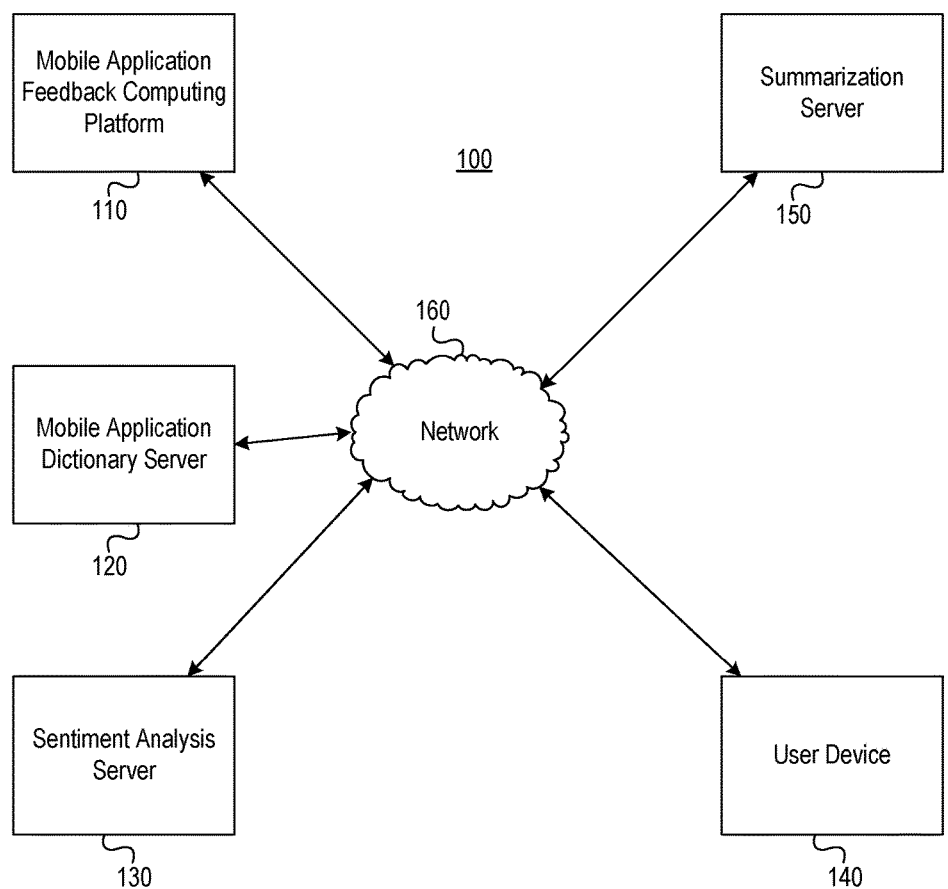
FIGS. 1A and 1B depict an illustrative computing environment for analyzing mobile application feedback using a natural language processing system in accordance with one or more example embodiments.
Figure 1B:
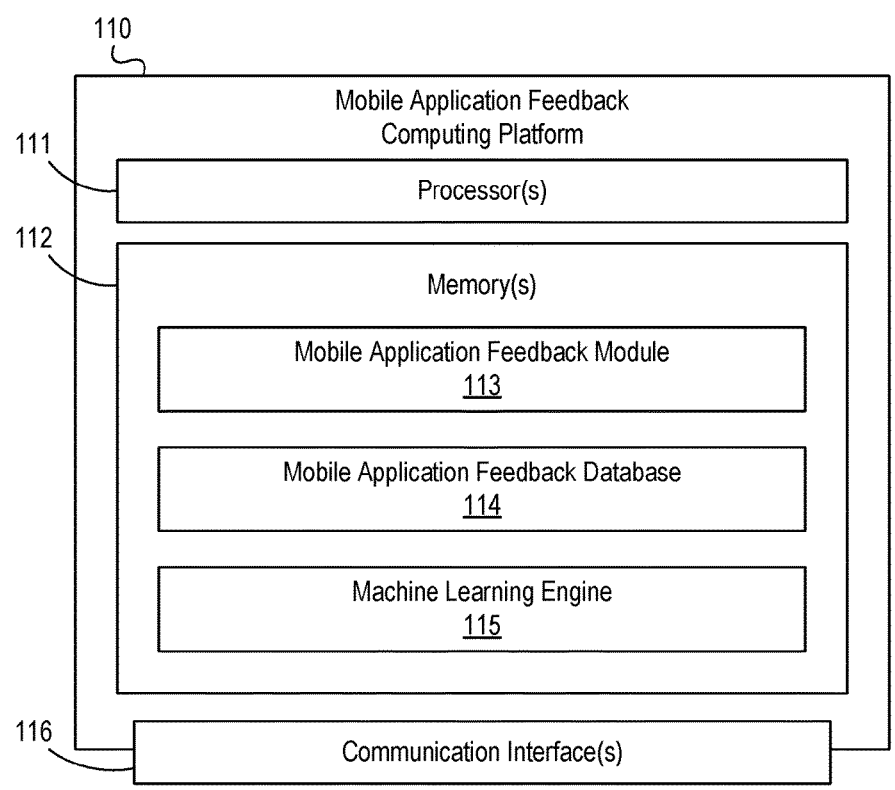

FIGS. 1A and 1B depict an illustrative computing environment for analyzing mobile application feedback using a natural language processing system in accordance with one or more example embodiments. Referring to FIG. 1A, computing environment 100 may include one or more computing devices and/or other computer systems. For example, computing environment 100 may include a mobile application feedback computing platform 110, a mobile application dictionary server 120, a sentiment analysis server 130, a user device 140, and a summarization server 150.

Mobile application feedback computing platform 110 may be configured to analyze mobile application feedback by controlling and/or directing actions of other devices and/or computer systems, and/or perform other functions, as discussed in greater detail below. In some instances, mobile application feedback computing platform 110 may perform and/or provide one or more techniques to analyze mobile application feedback.

Mobile application dictionary server 120 may be configured to store and/or maintain mobile application feedback information to analyze mobile application feedback. For example, mobile application dictionary server 120 may be configured to store and/or maintain information corresponding to mobile application topics, information corresponding to frequency of user feedback nouns, information corresponding to new mobile application topics and/or information corresponding to time of received user feedback. In some instances, the mobile application dictionary server 120 might not be another entity, but the functionalities of the mobile application dictionary server 120 may be included within the mobile application feedback computing platform 110.

Sentiment analysis server 130 may be configured to store and/or maintain mobile application feedback information to analyze mobile application feedback. For example, sentiment analysis server 130 may be configured to store and/or maintain information corresponding to user feedback about a mobile application, information corresponding to mobile application topics, information corresponding to a sentiment analysis model, and/or information corresponding to sentiments associated with the mobile application topics. Additionally, or alternatively, sentiment analysis server 130 may be configured to receive information corresponding to mobile application topics and/or user feedback about the mobile application, perform analysis on the user feedback about the mobile application to determine sentiments associated with the mobile application topics, identify sentiments associated with the mobile application topics, perform error analysis associated with sentiments of topics, communicate by receiving and/or sending information with the mobile application dictionary server 120, the user device 140, the summarization server 150, and/or perform other functions, as illustrated below. In some instances, sentiment analysis server 130 may receive, from the mobile application feedback computing platform 110 requests for information, transmit, to the mobile application feedback computing platform 110 requested information, receive, from the mobile application feedback computing platform 110 commands, execute commands received from the mobile application feedback computing platform 110, and/or perform other functions, as discussed in greater detail below. In some instances, the sentiment analysis server 130 might not be another entity, and the functionalities of the sentiment analysis server 130 may be included within the mobile application feedback computing platform 110.

User device 140 may be configured to be used by one or more users of computing environment 100. For example, the user device 140 may be configured to provide one or more user interfaces that enable the one or more users to use an application to perform a task associated with the application. The user device 140 may receive, from the one or more users, user input or selections and send the user input or selections to the mobile application feedback computing platform 110 and/or one or more other computer systems and/or devices in computing environment 100. The user device 140 may receive, from the mobile application feedback computing platform 110 and/or one or more other computer systems and/or devices in computing environment 100, information or data in response to the user input or selection.

Summarization server 150 may be a computing device configured to offer any desired service, and may run various languages and operating systems. For example, summarization server 150 may store information to assist in analyzing mobile application feedback. Summarization server 150 may provide one or more interfaces that allows communications with other systems (e.g., mobile application feedback computing platform 110, mobile application dictionary server 120, sentiment analysis server 130, and/or user device 140) in computing environment 100. In some instances, summarization server 165 may receive, from the mobile application feedback computing platform 110 requests for information; transmit, to the mobile application feedback computing platform 110 requested information; receive, from the mobile application feedback computing platform 110 commands; execute commands received from the mobile application feedback computing platform 110; and/or perform other functions, as discussed in greater detail below.

In one or more arrangements, mobile application dictionary server 120, sentiment analysis server 130, user device 140, and summarization server 150 may be any type of computing device capable of providing a user interface, receiving input via the user interface, and communicating the received input to one or more other computing devices. For example, mobile application dictionary server 120, sentiment analysis server 130, user device 140, and summarization server 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of mobile application dictionary server 120, sentiment analysis server 130, user device 140, and summarization server 150 may, in some instances, be special-purpose computing devices configured to perform specific functions.

Computing environment 100 also may include one or more computing platforms. For example, and as noted above, computing environment 100 may include mobile application feedback computing platform 110. As illustrated in greater detail below, the mobile application feedback computing platform 110 may include one or more computing devices configured to perform one or more of the functions described herein. For example, the mobile application feedback computing platform 110 may include one or more computers (e.g., laptop computers, desktop computers, servers, server blades, or the like).

Computing environment 100 also may include one or more networks, which may interconnect one or more of mobile application feedback computing platform 110, mobile application dictionary server 120, sentiment analysis server 130, user device 140, and summarization server 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, mobile application feedback computing platform 110, mobile application dictionary server 120, sentiment analysis server 130, user device 140, and summarization server 150 may be associated with an organization, and a private sub-network included in network 160 and associated with and/or operated by the organization may include one or more networks (e.g., LANs, WANs, virtual private networks (VPNs), or the like) that interconnect mobile application feedback computing platform 110, mobile application dictionary server 120, sentiment analysis server 130, user device 140, and summarization server 150. Network 160 also may include a public sub-network that may connect the private sub-network and/or one or more computing devices connected thereto (e.g., mobile application feedback computing platform 110, mobile application dictionary server 120, sentiment analysis server 130, user device 140, and summarization server 150) with one or more networks and/or computing devices that are not associated with the organization.

Referring to FIG. 1B, mobile application feedback computing platform 110 may include one or more processors 111, memory 112, and communication interface 116. A data bus may interconnect processor(s) 111, memory 112, and communication interface 116. Communication interface 116 may be a network interface configured to support communication between mobile application feedback computing platform 110 and one or more networks (e.g., network 160). Memory 112 may include one or more program modules having instructions that when executed by processor(s) 111 cause the mobile application feedback computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the mobile application feedback computing platform 110 and/or by different computing devices that may form and/or otherwise make up the mobile application feedback computing platform 110. For example, memory 112 may have, store, and/or include a mobile application feedback module 113, a mobile application feedback database 114, and a machine learning engine 115. Mobile application feedback module 113 may have instructions that direct and/or cause mobile application feedback computing platform 110 to analyze mobile application feedback, as discussed in greater detail below. Mobile application feedback database 114 may store information used by the mobile application feedback module 113 and/or the mobile application feedback computing platform 110 in analyzing mobile application feedback and/or in performing other functions. Machine learning engine 115 may have instructions that direct and/or cause the mobile application feedback computing platform 110 to set, define, and/or iteratively redefine optimization rules, techniques and/or other parameters used by mobile application feedback computing platform 110 and/or other systems in computing environment 100.

Figure 2A:
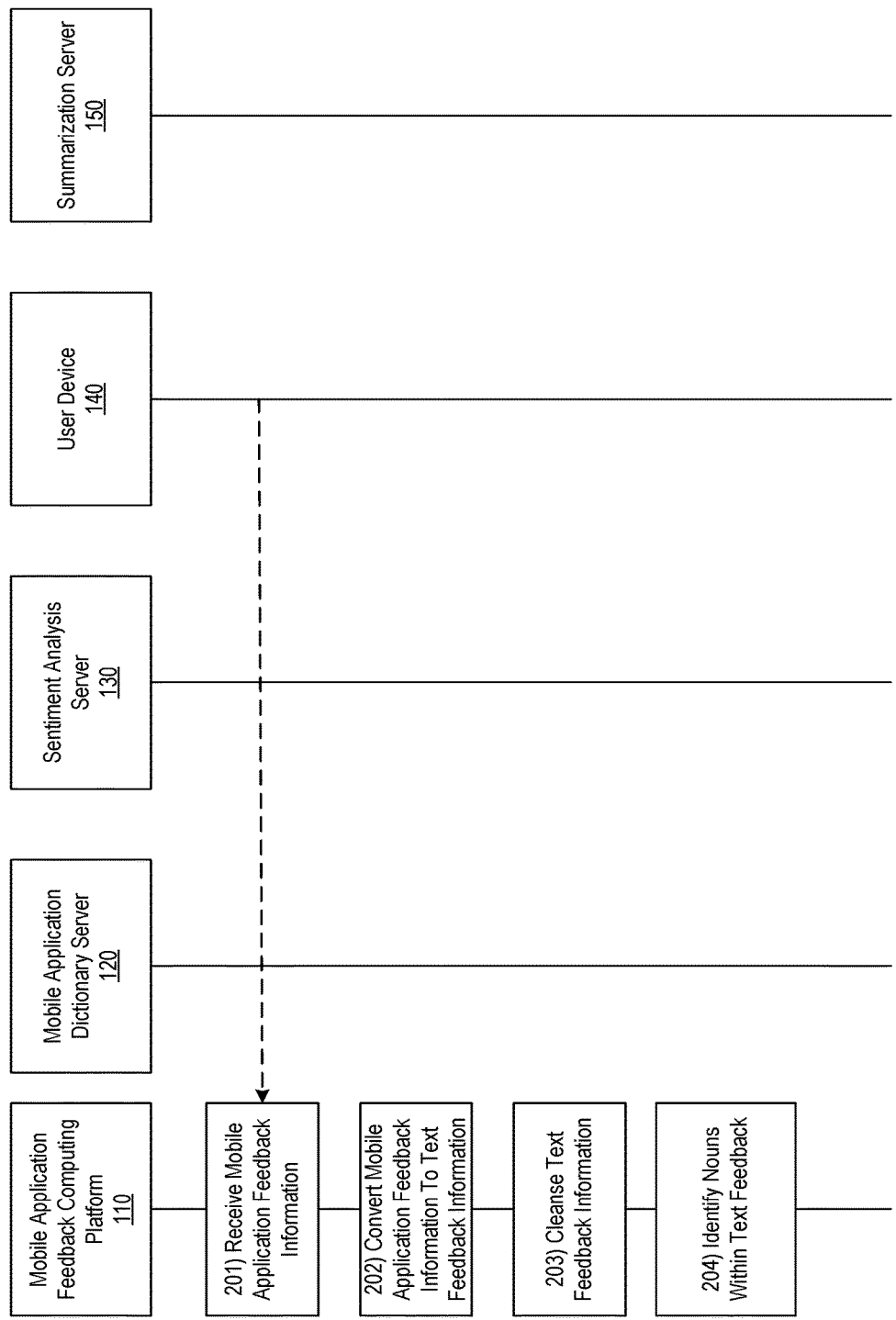

FIGS. 2A, 2B, 2C, 2D, and 2E depict an illustrative event sequence for analyzing mobile application feedback using a natural language processing system in accordance with one or more example embodiments. Referring to FIG. 2A, at step 201, mobile application feedback computing platform 110 may receive mobile application feedback information. For example, at step 201, mobile application feedback computing platform 110 may receive, via the communication interface (e.g., communication interface 116), from a user device (e.g., user device 140), mobile application feedback information. Mobile application feedback information may include information corresponding to user feedback about a mobile application. For example, after using a mobile application, a user, using the user device 140, may provide user feedback about the mobile application. User feedback may include surveys, rating systems, and/or questions about the mobile application. Additionally, developers of a mobile application may roll out new features (e.g., a new touch screen) for the mobile application. Developers may seek user feedback to determine the strengths and weaknesses of the new feature. In some instances, user device 140 may include a microphone. The microphone may allow the user device 140 to record a voice recording of the user feedback discussing the mobile application. After user device 140 records the voice recording of the user feedback, the mobile application feedback computing platform 110 may receive, from the user device 140, mobile application feedback information comprising the voice recording of the user feedback. Additionally, or alternatively, mobile application feedback computing platform 110 may receive, from the user device 140, mobile application feedback information comprising textual information and/or other non-voice information. In some instances, the mobile application feedback information received by mobile application feedback computing platform 110 from user device 140 may include only a voice recording of the user feedback, a combination of a voice recording of the user feedback and textual information and/or other non-voice information, or only textual information and/or other non-voice information. In addition, in some instances, mobile application feedback computing platform 110 may receive mobile feedback information from an application store server (which may, e.g., provide one or more software applications for download by one or more user devices, such as user device 140) instead of receiving the mobile feedback information directly from a user device, such as user device 140.

At step 202, mobile application feedback computing platform 110 may convert mobile application feedback information to text feedback information. For example, after receiving the mobile application feedback information in step 201, mobile application feedback computing platform 110 may convert the mobile application feedback information comprising the voice recording of the user feedback to text feedback information. The text feedback information may include text version (e.g., text feedback) of the voice recording, the textual information, and/or other non-voice information.

At step 203, mobile application feedback computing platform 110 may cleanse the text feedback information. For example, at step 203, mobile application feedback computing platform 110 may cleanse the text feedback information that was converted in step 202, textual information and/or other non-voice information. In some instances, the conversion from the voice recording to the text version may be inaccurate. For example, the text version may include spelling errors, grammatical errors, and/or other inaccuracies. The mobile application feedback computing platform 110 may cleanse the text feedback information by performing a spell check technique and/or a logical sentence fragmentation technique. For example, a part of the text feedback may include a sentence fragment. The mobile application feedback computing platform 110 may perform a logical sentence fragmentation to fix the segment fragment.

At step 204, mobile application feedback computing platform 110 may identify nouns within the text feedback. For example, mobile application feedback computing platform 110 may identify nouns within the text feedback based on the cleansed text feedback information in step 203. Nouns within the text feedback may include subjects and/or objects of sentences within the text feedback. For example, mobile application feedback computing platform 110 may use a part of speech based tagging system to tag parts of speech within the text feedback. After tagging parts of speech, mobile application feedback computing platform 110 may identify one or more nouns (e.g., objects, subjects, pronouns, etc.) within the text feedback.

Figure 2B:
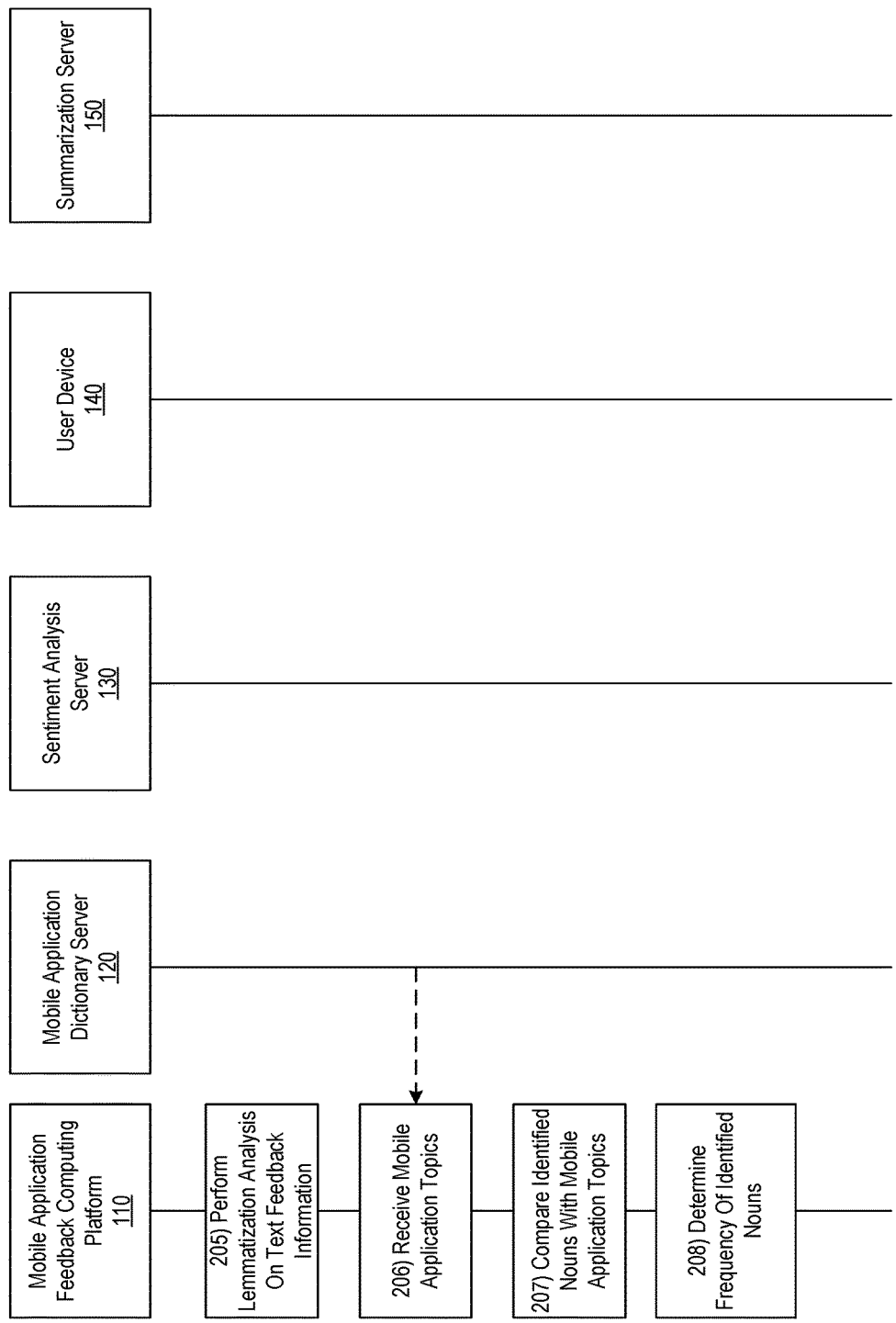

Referring to FIG. 2B, at step 205, mobile application feedback computing platform 110 may perform lemmatization analysis on the text feedback information. For example, at step 205, mobile application feedback computing platform 110 may perform a lemmatization analysis technique on the text feedback information to modify the text feedback information. Lemmatization analysis may change different inflected forms of a word to one word. For example, in performing a lemmatization analysis technique on the text feedback information to modify the text feedback information, the word "bank," the word "banks," and/or the word "banking" may be grouped together and changed by mobile application feedback computing platform 110 to one word, such as "bank." Mobile application feedback computing platform 110 may perform lemmatization analysis on the text feedback information in step 203 and/or on the identified nouns in step 204. The mobile application feedback computing platform 110 may be more accurate in identifying user feedback topics within the mobile application after changing different inflected forms of a word to one word.

In some examples, lemmatization analysis may include determining synonyms for words within the text feedback information. For example, mobile application feedback computing platform 110 may determine synonyms associated with one or more words within the text feedback. The mobile application feedback computing platform 110 may modify the text feedback information to replace the one or more words within the text feedback with the determined synonyms.

At step 206, mobile application feedback computing platform 110 may receive mobile application topics. For example, mobile application feedback computing platform 110 may receive, from a mobile application dictionary server 120, mobile application topics. Mobile application topics may include topics associated with features, attributes, and/or keywords of a mobile application. For example, user feedback (e.g., "touch login is awesome but not able to deposit checks from my smartphone several times") may encompass a plurality of different topics (e.g., touch login and/or deposit checks) about a mobile application. Mobile application feedback computing platform 110 may categorize the plurality of different topics about the mobile application and store the topics in the mobile application dictionary server 120. The mobile application feedback computing platform 110 may retrieve, from the mobile application dictionary server 120, the plurality of mobile application topics.

At step 207, mobile application feedback computing platform 110 may compare identified nouns with mobile application topics. For example, at step 207, mobile application feedback computing platform 110 may compare the identified nouns in step 204 and/or step 205 with the received mobile application topics in step 206. The mobile application feedback computing platform 110 may determine, based on the comparison, whether the identified nouns match the received mobile application topics. For example, user feedback about the mobile application may discuss one or more mobile application topics. By comparing the identified nouns and the mobile application topics, the mobile application feedback computing platform 110 may identify the one or more mobile application topics discussed in the user feedback (e.g., text feedback topics).

In some instances, mobile application feedback computing platform 110 may identify verbs within the text feedback. In such instances, the mobile application feedback computing platform 110 may identify, based on a comparison between the verbs within the text feedback with the received mobile application topics, text feedback topics.

At step 208, mobile application feedback computing platform 110 may determine a frequency of the identified nouns. For example, at step 208, mobile application feedback computing platform 110 may determine, based on the identified nouns in step 204 and/or step 205, a frequency or an amount of past user feedback related to one or more nouns identified above. For example, mobile application feedback computing platform 110 may receive, from a plurality of user devices, mobile application feedback information comprising a plurality of past text feedback related to feedback about the mobile application. The mobile application feedback computing platform 110 may perform the steps above to identify a plurality of nouns from the plurality of past text feedback. Based on comparing the plurality of identified nouns with the plurality of mobile application topics discussed above, the mobile application feedback computing platform 110 may identify one or more mobile application topics discussed in the plurality of text feedback. The mobile application feedback computing platform 110 may count a frequency or an amount of past text feedback (e.g., past user feedback) discussing the identified nouns and/or the identified mobile application topics.

In some instances, the mobile application feedback computing platform 110 may receive mobile application feedback information comprising a plurality of time stamps associated with the plurality of past text feedback. For example, each time stamp may correspond to a time a user device recorded a past text feedback.

Referring to FIG. 2C, at step 209, mobile application feedback computing platform 110 may identify topics within the text feedback. For example, based on the comparison between the identified nouns with the mobile application topics in step 207, the mobile application feedback computing platform may identify topics within the text feedback. In some instances, the identified nouns in the text feedback may match with one or more mobile application topics. The mobile application feedback computing platform 110 may identify topics discussed in the text feedback (e.g., text feedback topics) by matching the identified nouns in the text feedback with the mobile application topics received from the mobile application dictionary server 120.

In some examples, mobile application feedback computing platform 110 may use the frequency of the identified nouns to identify topics discussed in the text feedback (e.g., text feedback topics). For example, as explained above, mobile application feedback computing platform 110 may identify nouns within the text feedback. After identifying the nouns, the mobile application feedback computing platform 110 may determine the frequency of text feedback (e.g., past user feedback) discussing the identified nouns. If the frequency of an identified noun meets or exceeds a pre-defined threshold set by the mobile application feedback computing platform 110, the mobile application feedback computing platform 110 may identify the identified noun as a topic within the text feedback (e.g., text feedback topic). The mobile application dictionary server 120 and/or the mobile application feedback computing platform memory 112 may store information corresponding to the pre-defined threshold. Additionally, and/or alternatively, an administrator and/or developer of the mobile application may set and/or change the pre-defined threshold.

In some embodiments, the mobile application feedback computing platform 110 may use the frequency of the identified nouns and/or the time stamps to identify topics discussed in the text feedback (e.g., text feedback topics). For example, each past text feedback may be associated with a time stamp. The mobile application feedback computing platform 110 may filter the past text feedback (e.g., past user feedback) based on the time stamp associated with the past text feedback being within a period of time. After filtering the past text feedback, the mobile application feedback computing platform 110 may determine the frequency of the filtered past text feedback discussing the identified nouns over the period of time (e.g., the number of times an identified noun was discussed within a time period). If the frequency of an identified noun from the filtered past text feedback meets or exceeds a pre-defined threshold set by the mobile application feedback computing platform 110, the mobile application feedback computing platform 110 may identify the identified noun as a topic within the text feedback (e.g., text feedback topic). Additionally, and/or alternatively, an administrator and/or developer of the mobile application may set and/or change the period of time used to filter the past text feedback. The mobile application dictionary server 120 and/or the mobile application feedback computing platform memory 112 may store information corresponding to the period of time used to filter the past text feedback.

At step 210, mobile application feedback computing platform 110 may store new topics within the text feedback. For example, the mobile application feedback computing platform 110 may store new topics (identified in step 209) within the text feedback in the mobile application dictionary server 120 and/or the mobile application feedback computing platform memory 112. New topics may be topics not already included in the mobile application topics. For example, the mobile application feedback computing platform 110 may identify text feedback topics based on the identified nouns in the text feedback matching one or more mobile application topics. If, for example, one or more identified nouns do not match with any of the mobile application topics, the mobile application feedback computing platform 110 may identify text feedback topics based on the frequency and/or the time period associated with the past text feedback discussing the identified nouns. The text feedback topics identified based on the frequency and/or time period might not be included in the mobile application topics and may be new topics within the text feedback. The mobile application feedback computing platform 110 may modify the mobile application topics to include the new topics within the text feedback. After modifying the mobile application topics, the mobile application feedback computing platform 110 may store the mobile application topics (e.g., the mobile application topics including the new topics within the text feedback) in the mobile application dictionary server 120 and/or the mobile application feedback computing platform memory 112. In another iteration of the process, the mobile application feedback computing platform 110 may identify text feedback topics based on the mobile application topics that include the new topics.

At step 211, mobile application feedback computing platform 110 may perform analysis on the text feedback topics within the text feedback. For example, user feedback may include multiple different text feedback topics. The mobile application feedback computing platform 110 may determine locations within the text feedback (e.g., the sentence and/or position within a sentence) where the user feedback discusses one or more text feedback topics. To determine the locations within the text feedback, the mobile application feedback computing platform 110 may parse through the text feedback and identify instances where the text feedback discusses the one or more text feedback topics. Afterwards, the mobile application feedback computing platform 110 may extract, from the text feedback information, words, phrases, and/or sentences discussing the text feedback topics. For example, based on the locations of the text feedback topics within the text feedback, the mobile application feedback computing platform 110 may extract the words, phrases, and/or sentences adjacent to the location of the text feedback topic and/or containing the text feedback topic.

In some instances, the mobile application feedback computing platform 110 may extract words, phrases, and/or sentences associated with the text feedback topic using a natural language processing (NLP) based dependency parser output. For example, sentence structure and/or parts of speech (POS) of sentences may be used to determine relationships and/or connections between the words and/or topics of a sentence. Using a NLP based dependency parser to determine one or more subjects, objects, actions, and/or qualities (e.g., POS and/or sentence structure) within the text feedback, the mobile application feedback computing platform 110 may determine connections and/or relationships between the words, phrases, and/or sentences within the text feedback. After determining the connections, the mobile application feedback computing platform 110 may parse through the text feedback and extract words, phrases, and/or sentences related to the text feedback topics.

In some examples, a sentence within the text feedback may include multiple different text feedback topics. The mobile application feedback computing platform 110 may parse through the sentence within the text feedback to identify instances in the sentence where the text feedback discusses the multiple different text feedback topics. Subsequently, the mobile application feedback computing platform 110 may extract, from the text feedback information, words, phrases, and/or sentences discussing the multiple different text feedback topics within the sentence.

At step 212, mobile application feedback computing platform 110 may receive a sentiment analysis model. For example, the mobile application feedback computing platform 110 may receive, from the sentiment analysis server 130, information corresponding to a sentiment analysis model. The sentiment analysis model may include past recorded data associated with one or more text feedback topics. For example, past recorded data may comprise past text feedback discussing one or more text feedback topics, the one or more text feedback topics, and/or one or more sentiments corresponding to the one or more text feedback topics. Sentiments may be positive (e.g., positive user feedback about the topic), negative (e.g., negative user feedback about the topic), and/or neutral (e.g., neutral user feedback about the topic). In some examples, sentiments may be based on a scale (e.g., one to five stars and/or a rating of one to ten).

In some examples, an administrator and/or developer may parse through past recorded data, including past text feedback information, to identify the text feedback topics, one or more phrases discussing the text feedback topics, and/or one or more sentiments corresponding to the text feedback topics. Afterwards, the administrator and/or developer of the mobile application, using a user device, may transmit, to the mobile application feedback computing platform 110, training data comprising the user feedback, the text feedback topics, and/or one or more sentiments corresponding to the text feedback topics. In some instances, the mobile application feedback computing platform 110 may use the training data to update the sentiment analysis model. For example, and explained in further detail below, the machine learning engine 115 may update the sentiment analysis model, using the training data, to set, define, and/or iteratively redefine optimization rules, techniques and/or other parameters used by mobile application feedback computing platform 110 in identifying the one or more sentiments corresponding to the text feedback topics.

Figure 2D:
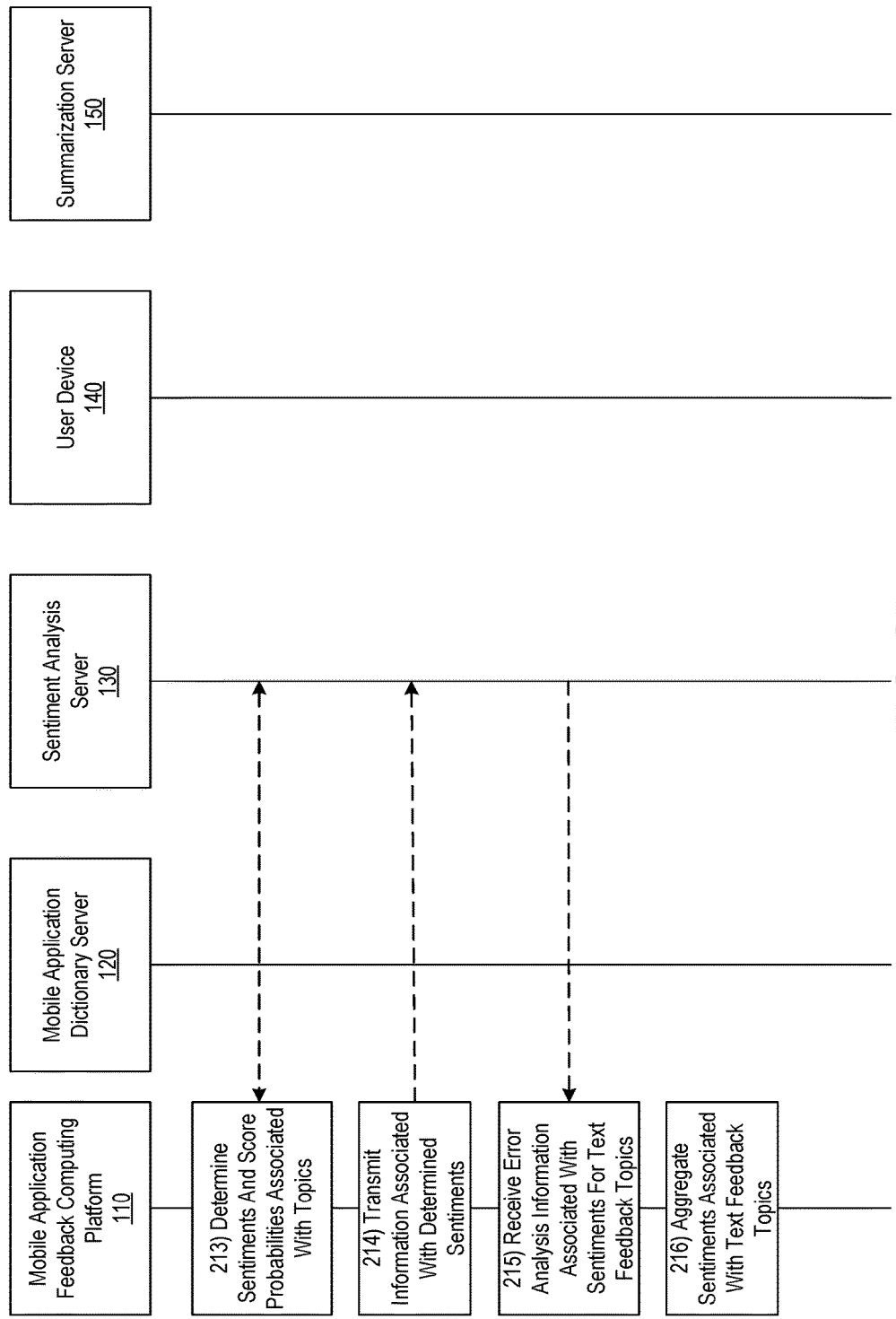

Referring to FIG. 2D, at step 213, mobile application feedback computing platform 110 may determine sentiments and/or score probabilities associated with text feedback topics. For example, the mobile application feedback computing platform 110 may determine sentiments and score probabilities for each of the text feedback topics identified in the text feedback. In some examples, the mobile application feedback computing platform 110 may transmit one or more commands directing a sentiment analysis server 130 to perform one or more techniques to determine sentiments and/or score probabilities associated with the text feedback topics.

In some instances, the mobile application feedback computing platform 110 may identify sentiments based on the sentiment analysis model. For example, as explained above, the mobile application feedback computing platform 110 may extract words, phrases, and/or sentences related to a text feedback topic and/or identify the locations of the text feedback topic within the text feedback. The mobile application feedback computing platform 110 may compare the extracted words, phrases, and/or sentences related to the text feedback topic with the sentiment analysis model, as explained above, to identify one or more sentiments associated with the text feedback topic. For example, the mobile application feedback computing platform 110 may identify one or more sentiments for the text feedback topics based on similar words, phrases, and/or sentences within the sentiment analysis model and the extracted text feedback.

In some examples, after identifying the one or more sentiments, the mobile application feedback computing platform 110 may determine score probabilities for the one or more identified sentiments. For example, the mobile application feedback computing platform 110 may determine, based on the similar words, phrases, and/or sentences between the sentiment analysis model and the extracted text feedback, a score probability that the text feedback topic is a positive sentiment, a score probability that the text feedback topic is a negative sentiment, and/or a score probability that the text feedback topic is a neutral sentiment. In some instances, the mobile application feedback computing platform 110 may assign higher score probabilities based on the similarities between the words, phrases, and/or sentences between the sentiment analysis model and the extracted text feedback associated with the one or more sentiments. If, for example, the words, phrases, and/or sentences between the sentiment analysis model and the extracted text feedback are similar except for tenses, singular or plural nouns, and/or prefixes or suffixes, the score probabilities may be higher (e.g., the identified sentiment may be more likely correct). If, for example, the words, phrases, and/or sentences between the sentiment analysis model and the extracted text feedback are different because of different words (e.g., missing words and/or addition of words) and/or phrases, then the score probabilities may be lower (e.g., the identified sentiment may be less likely correct).

At step 214, mobile application feedback computing platform 110 may transmit, via the communication interface 116 and to the sentiment analysis server 130, information associated with the determined sentiments. For example, the mobile application feedback computing platform 110 may transmit information associated with the determined sentiments (e.g., the one or more sentiments determined in step 213, the one or more score probabilities determined in step 213, the text feedback topics, and/or the text feedback) to the sentiment analysis server 130. In some instances, the mobile application feedback computing platform 110 may generate one or more commands to direct the sentiment analysis server 130 to perform error analysis on the one or more identified sentiments and/or the one or more identified text feedback topics.

In some examples, the mobile application feedback computing platform 110 may transmit the information associated with the determined sentiments based on the score probability. For example, an administrator and/or a developer of the mobile application may use a user device to set and/or change two pre-defined thresholds. The mobile application feedback computing platform 110 may use the two pre-defined thresholds to determine if the identified sentiment for the text feedback topic is accurate. If, for example, the mobile application feedback computing platform 110 determines the score probability for an identified sentiment meets or exceeds both pre-defined thresholds, the mobile application feedback computing platform 110 might not transmit the information associated with the determined sentiments. Further, the mobile application feedback computing platform 110 may determine the identified sentiment for the text feedback topic is accurate. If, for example, the mobile application feedback computing platform 110 determines the score probability for an identified sentiment is less than one pre-defined threshold, but greater than another pre-defined threshold, the mobile application feedback computing platform 110 may transmit the information associated with the determined sentiments for error analysis. If, for example, the mobile application feedback computing platform 110 determines the score probability for an identified sentiment is less than both pre-defined thresholds, the mobile application feedback computing platform 110 might not transmit the information associated with the determined sentiments. Further, the mobile application feedback computing platform 110 may determine the identified sentiment for the text feedback topic is inaccurate and may repeat the process to determine a more accurate sentiment, text feedback topic, and/or score probability.

At step 215, mobile application feedback computing platform 110 may receive, via the communication interface 116 and from the sentiment analysis server 130, error analysis information associated with one or more sentiments for the one or more text feedback topics. For example, based on the information associated with the determined sentiments, the sentiment analysis server 130 may perform error analysis on the one or more identified sentiments. After performing error analysis on the identified sentiment, the sentiment analysis server 130 may transmit error analysis information associated with the one or more identified sentiments.

In some examples, the sentiment analysis server 130 may transmit information associated with the determined sentiments to a user device associated with an administrator and/or a developer. The administrator and/or developer, using the user device, may parse through the information associated with the text feedback to identify the text feedback topics, one or more phrases discussing the text feedback topics, and/or one or more sentiments corresponding to the text feedback topics. Additionally, the administrator and/or developer, using the user device, may determine errors with the mobile application feedback computing platform 110 comparison between the words, phrases, and/or sentences in the sentiment analysis model with the text feedback. Afterwards, the administrator and/or developer of the mobile application, using the user device, may transmit, to the mobile application feedback computing platform 110, error analysis information comprising the text feedback topics, the one or more phrases discussing the text feedback topics, the one or more sentiments corresponding to the text feedback topics and/or information associated with errors the mobile application feedback computing platform 110 made during the comparison between the sentiment analysis model with the text feedback.

In some instances, the machine learning engine 115 may update, based on the error analysis information, the sentiment analysis model to set, define, and/or iteratively redefine optimization rules, techniques and/or other parameters used by mobile application feedback computing platform 110 in identifying the one or more sentiments corresponding to the text feedback topics. For example, based on information associated with errors the mobile application feedback computing platform 110 made during the comparison between the sentiment analysis model with the text feedback, the machine learning engine 115 may update the sentiment analysis model. Thus, in another iteration of the process, such as when the mobile application feedback computing platform 110 receives new mobile application feedback information from user device 140, the updated sentiment analysis model may be used to identify one or more sentiments for the text feedback topics.

Figure 3:
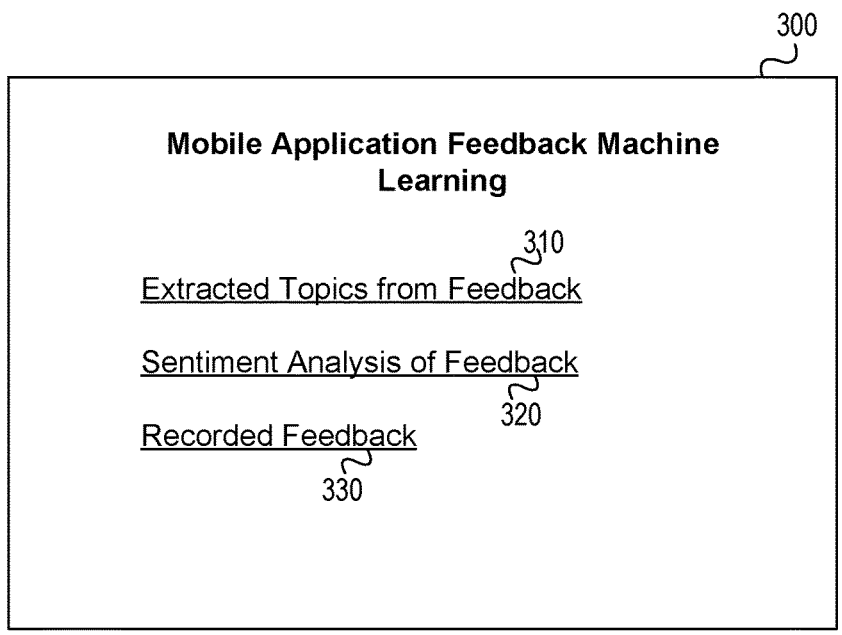
FIGS. 3 and 4 depict example graphical user interfaces for analyzing mobile application feedback using a natural language processing system in accordance with one or more example embodiments.

As seen in FIG. 3, graphical user interface 300 may include one or more fields, controls, and/or other elements that may allow a user (e.g., an administrator and/or a developer of the mobile application) to interact with links and/or parse through the information associated with the text feedback to identify the text feedback topics, the phrases discussing the text feedback topics, and/or sentiments corresponding to the text feedback topics. For example, the graphical user interface 300 may allow an administrator and/or a developer of the mobile application to use links to view the extracted topics from the feedback 310, the sentiment analysis of the feedback 320, and/or the recorded feedback 330. After viewing the extracted topics, sentiment analysis, and/or the recorded feedback, the administrator and/or the developer may determine errors with the mobile application feedback computing platform 110 comparison between the words, phrases, and/or sentences in the sentiment analysis model with the text feedback. The mobile application feedback computing platform 110 may use information corresponding to the determined comparison errors between the words, phrases, and/or sentences in the sentiment analysis model with the text feedback to update the sentiment analysis model as described above.

At step 216, mobile application feedback computing platform 110 may aggregate sentiments associated with the text feedback topics. For example, the mobile application feedback computing platform 110 may identify, based on a plurality of past user feedback, one or more sentiments for a plurality of different text feedback topics. After identifying the one or more sentiments, the mobile application feedback computing platform 110 may aggregate the one or more sentiments for each of the plurality of different text feedback topics.

Figure 2E:
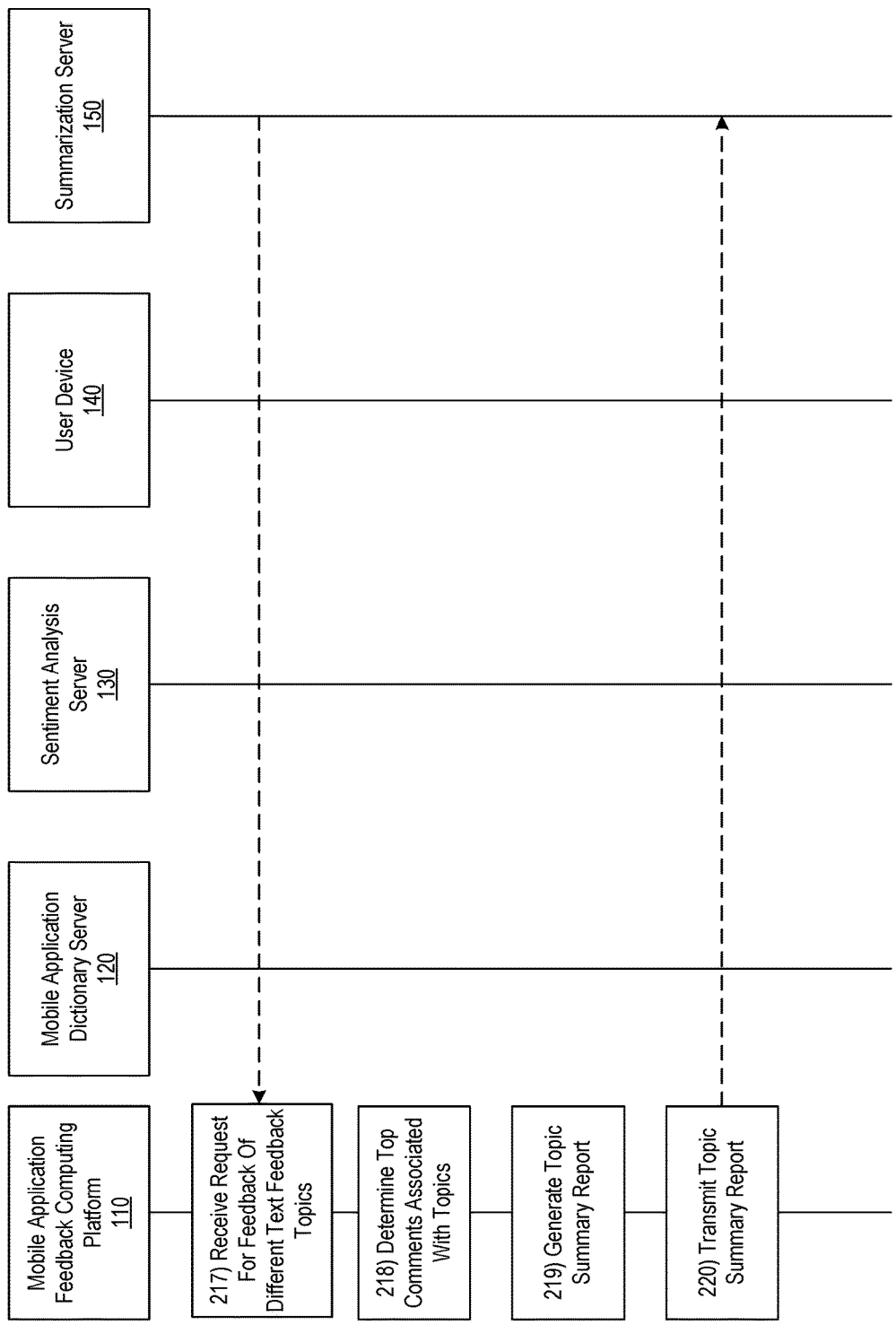

Referring to FIG. 2E, at step 217, mobile application feedback computing platform 110 may receive one or more requests for feedback of different text feedback topics. For example, an administrator and/or developer of a mobile application, using a user device, may request feedback for a plurality of text feedback topics. The mobile application feedback computing platform 110 may receive a request for feedback for the plurality of text feedback topics. In some instances, the request may include information associated with a request for one or more specific text feedback topics and/or a time period for the one or more text feedback topics.

At step 218, mobile application feedback computing platform 110 may determine one or more top comments associated with the text feedback topics. For example, the mobile application feedback computing platform 110 may use a cosine similarity technique to determine one or more top comments for a plurality of text feedback topics. In some instances, the one or more top comments may include a list of the most frequently occurring phrases for each of the plurality of text feedback topics. For example, the mobile application feedback computing platform 110 may determine, based on a cosine similarity score, the words present in the phrases discussing the one or more text feedback topics are more likely to occur together than separately. Based on the determination, the mobile application feedback computing platform 110 may provide the top comments associated with the text feedback topics.

At step 219, mobile application feedback computing platform 110 may generate a topic summary report. For example, based on the received request for feedback of different text feedback topics in step 217, the mobile application feedback computing platform 110 may generate a topic summary report. The topic summary report may include one or more text feedback topics, one or more sentiments associated with the text feedback topics, and/or one or more top comments associated with the text feedback topics. In some instances, the topic summary report may include information associated with the request for one or more specific text feedback topics and/or a requested time period for the one or more text feedback topics.

Figure 4:
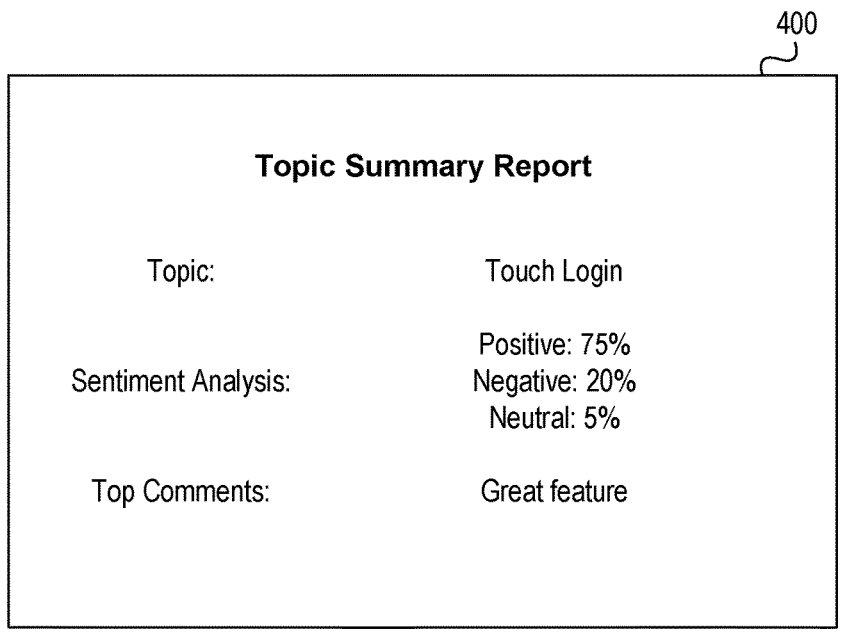

As seen in FIG. 4, graphical user interface 400 may include one or more fields, controls, and/or other elements that may allow a user (e.g., an administrator and/or a developer of the mobile application) to view a topic summary report in the summarization server 150. For example, the graphical user interface 400 may allow a user (e.g., an administrator and/or a developer) to view a text feedback topic associated with the mobile application, one or more sentiments associated with the text feedback topic, and/or top comments associated with the text feedback topic. For example, as shown in FIG. 4, a text feedback topic associated with the plurality of text feedback may be displayed in the topic summary report. As described in step 217, the text feedback topic may be a topic requested by an administrator and/or developer of a mobile application. Additionally, after aggregating sentiments associated with the text feedback topics in step 216, sentiments (e.g., positive sentiments, negative sentiments, and/or neutral sentiments) may be displayed in the topic summary report. Further, as described in step 218, top comments associated with the text feedback topic may be displayed in the topic summary report.

At step 220, mobile application feedback computing platform 110 may transmit the topic summary report to the summarization server 150. For example, the mobile application feedback computing platform 110 may transmit, via the communication interface 116 and to the summarization server 150, the topic summary report generated in step 219. An administrator and/or developer of the mobile application may use the topic summary report to further improve the mobile application. For example, based on the one or more sentiments for a text feedback topic, an administrator and/or a developer may identify problems with the mobile application. After identifying problems with the mobile application, the administrator and/or developer may develop fixes for the mobile application to address the identified problems in the topic feedback report.

Figure 5:
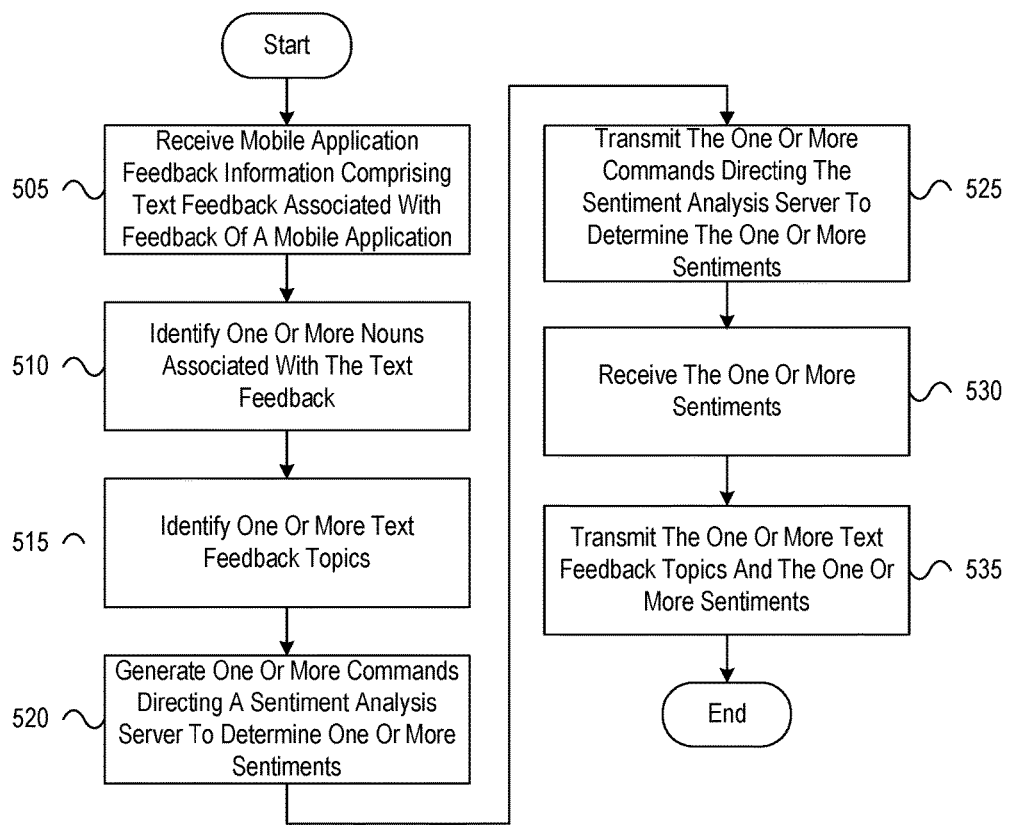
FIG. 5 depicts an illustrative method for analyzing mobile application feedback using a natural language processing system in accordance with one or more example embodiments.

FIG. 5 depicts an illustrative method for analyzing mobile application feedback using a natural language processing system in accordance with one or more example embodiments. Referring to FIG. 5, at step 505, a computing platform having at least one processor, a memory, and a communication interface may receive, by the at least one processor, via the communication interface, and from a first user device, mobile application feedback information comprising text feedback associated with feedback of a mobile application. At step 510, the computing platform may identify, based on the text feedback, one or more nouns associated with the text feedback. At step 515, the computing platform may identify, based on a comparison between the one or more nouns with a plurality of mobile application topics associated with the mobile application, one or more text feedback topics. At step 520, the computing platform may generate, based on the one or more text feedback topics, one or more commands directing a sentiment analysis server to determine one or more sentiments for the one or more text feedback topics. At step 525, the computing platform may transmit, via the communication interface and to the sentiment analysis server, the one or more commands directing the sentiment analysis server to determine the one or more sentiments. At step 530, the computing platform may receive, via the communication interface and from the sentiment analysis server, the one or more sentiments. At step 535, the computing platform may transmit, via the communication interface and to a summarization server, the one or more text feedback topics and the one or more sentiments.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, by the at least one processor, via the communication interface, and from a first user device, mobile application feedback information comprising text feedback associated with feedback of a mobile application;
   identify, based on the text feedback, one or more nouns associated with the text feedback;
   identify, based on a comparison between the one or more nouns with a plurality of mobile application topics associated with the mobile application, one or more text feedback topics;
   generate, based on the one or more text feedback topics, one or more commands directing a sentiment analysis server to determine one or more sentiments for the one or more text feedback topics, wherein the generating the one or more commands directing the sentiment analysis server to determine the one or more text feedback topics comprises:
   determining, based on performing sentiment analysis on a part of the text feedback associated with the one or more text feedback topics, the one or more sentiments for the one or more text feedback topics, wherein determining the one or more sentiments for the one or more text feedback topics comprises:
   receiving a sentiment analysis model comprising past recorded user feedback data, and
   determining, based on a comparison between the sentiment analysis model and the part of the text feedback associated with the one or more text feedback topics, the one or more sentiments and one or more score probabilities associated with the one or more sentiments, and
   transmitting the one or more sentiments for the one or more text feedback topics;
   transmit, via the communication interface and to the sentiment analysis server, the one or more commands directing the sentiment analysis server to determine the one or more sentiments;
   receive, via the communication interface and from the sentiment analysis server, the one or more sentiments; and
   transmit, via the communication interface and to a summarization server, the one or more text feedback topics and the one or more sentiments.

2. The computing platform of claim 1, wherein the memory stores additional computer-readable instructions that, when executed by the at least one processor, cause the computing platform to:
   modify, using a lemmatization analysis technique, the text feedback to generate cleansed text feedback; and
   wherein the one or more nouns associated with the text feedback is identified based on the cleansed text feedback.

3. The computing platform of claim 1, wherein the memory stores additional computer-readable instructions that, when executed by the at least one processor, cause the computing platform to:
   receive, via the communication interface and from a mobile application dictionary server, the plurality of mobile application topics associated with the mobile application; and wherein the identifying the one or more text feedback topics is based on the one or more nouns matching one or more mobile application topics from the plurality of mobile application topics.

4. The computing platform of claim 3, wherein the memory stores additional computer-readable instructions that, when executed by the at least one processor, cause the computing platform to:
responsive to the one or more nouns not matching the plurality of mobile application topics, determine a frequency of user feedback associated with the one or more nouns and a time period associated with the one or more nouns; and
identify, based on the frequency of user feedback and the time period, new mobile application topics associated with the mobile application.

5. The computing platform of claim 4, wherein the memory stores additional computer-readable instructions that, when executed by the at least one processor, cause the computing platform to:
modify the plurality of mobile application topics associated with the mobile application to include the new mobile application topics; and
transmit, via the communication interface and to the mobile application dictionary server, the plurality of modified mobile application topics.

6. The computing platform of claim 1, wherein the determining the one or more sentiments comprises:
extracting, based on using a natural language processing based dependency parser, the part of the text feedback associated with the one or more text feedback topics; and
determining the one or more sentiments from the part of the text feedback associated with the one or more text feedback topics.

7. The computing platform of claim 1, wherein the determining the one or more score probabilities is based on similarities between the part of the text feedback associated with the one or more text feedback topics and phrases within the sentiment analysis model.

8. The computing platform of claim 1, wherein the mobile application feedback information further comprises a voice recording associated with feedback of the mobile application; and
wherein the memory stores additional computer-readable instructions that, when executed by the at least one processor, cause the computing platform to generate the text feedback from the voice recording.

9. The computing platform of claim 1, wherein the memory stores additional computer-readable instructions that, when executed by the at least one processor, cause the computing platform to:
receive, by the at least one processor, via the communication interface, and from a plurality of user devices, second mobile application feedback information comprising a plurality of text feedback associated with feedback of the mobile application;
identify, based on the plurality of text feedback, a plurality of nouns associated with the plurality of text feedback;
identify, based on a comparison between the plurality of nouns with the plurality of mobile application topics associated with the mobile application, a plurality of text feedback topics associated with the plurality of text feedback;
generate, based on the plurality of text feedback topics associated with the plurality of text feedback, one or more commands directing the sentiment analysis server to determine a plurality of sentiments for the plurality of text feedback topics associated with the plurality of text feedback;
transmit, via the communication interface and to the sentiment analysis server, the one or more commands directing the sentiment analysis server to determine the plurality of sentiments, wherein each of the plurality of sentiments corresponds to a text feedback topic from the plurality of text feedback topics associated with the plurality of text feedback;
receive, via the communication interface and from the sentiment analysis server, the plurality of sentiments; and
transmit, via the communication interface and to the summarization server, the plurality of text feedback topics associated with the plurality of text feedback and the plurality of sentiments.

10. The computing platform of claim 9, wherein the memory stores additional computer-readable instructions that, when executed by the at least one processor, cause the computing platform to:
aggregate the plurality of text feedback topics associated with the plurality of text feedback and the plurality of sentiments;
determine one or more extracted comments from the plurality of text feedback associated with popular user feedback comments corresponding to the mobile application;
generate, based on the aggregated plurality of text feedback topics associated with the plurality of text feedback, the aggregated plurality of sentiments, and the one or more extracted comments, a report associated with the second mobile application feedback information; and
transmit, via the communication interface and to the summarization server, the report.

11. A method comprising:
at a computing platform comprising at least one processor, memory, and a communication interface:
receiving, by the at least one processor, via the communication interface, and from a first user device, mobile application feedback information comprising text feedback associated with feedback of a mobile application;
identifying, by the at least one processor, based on the text feedback, one or more nouns associated with the text feedback;
identifying, by the at least one processor and based on a comparison between the one or more nouns with a plurality of mobile application topics associated with the mobile application, one or more text feedback topics;
generating, by the at least one processor and based on the one or more text feedback topics, one or more commands directing a sentiment analysis server to determine one or more sentiments for the one or more text feedback topics, wherein the generating the one or more commands directing the sentiment analysis server to determine the text feedback topics comprises:
determining, by the at least one processor and based on performing sentiment analysis on a part of the text feedback associated with the one or more text feedback topics, the one or more sentiments for the one or more text feedback topics, wherein determining the one or more sentiments comprises:

receiving, by the at least one processor, a sentiment analysis model comprising past recorded user feedback data, and determining, by the at least one processor and based on a comparison between the sentiment analysis model and the part of the text feedback associated with the one or more text feedback topics, the one or more sentiments and one or more score probabilities associated with the one or more sentiments, and transmitting the one or more sentiments for the one or more text feedback topics;

transmitting, by the at least one processor, via the communication interface, and to the sentiment analysis server, the one or more commands directing the sentiment analysis server to determine the one or more sentiments;

receiving, by the at least one processor, via the communication interface, and from the sentiment analysis server, the one or more sentiments; and transmitting, by the at least one processor, via the communication interface, and to a summarization server, the one or more text feedback topics and the one or more sentiments.

12. The method of claim 11, further comprising:

modifying, by the at least one processor and using a lemmatization analysis technique, the text feedback to generate cleansed text feedback; and wherein the one or more nouns associated with the text feedback is identified based on the cleansed text feedback.

13. The method of claim 11, further comprising:

receiving, by the at least one processor, via the communication interface, and from a mobile application dictionary server, the plurality of mobile application topics associated with the mobile application; and wherein the identifying the one or more text feedback topics is based on the one or more nouns matching one or more mobile application topics from the plurality of mobile application topics.

14. The method of claim 11, wherein the determining the one or more sentiments comprises:

extracting, by the at least one processor and based on using a natural language processing based dependency parser, the part of the text feedback associated with the one or more text feedback topics; and determining, by the at least one processor, the one or more sentiments from the part of the text feedback associated with the one or more text feedback topics.

15. The method of claim 11, wherein the determining the one or more score probabilities is based on similarities between the part of the text feedback associated with the one or more text feedback topics and phrases within the sentiment analysis model.

16. One or more non-transitory computer-readable media storing instructions that, when executed by a computing platform comprising at least one processor, memory, and a communication interface, cause the computing platform to:

receive, by the at least one processor, via the communication interface, and from a first user device, mobile application feedback information comprising text feedback associated with feedback of a mobile application;

identify, based on the text feedback, one or more nouns associated with the text feedback;

identify, based on a comparison between the one or more nouns with a plurality of mobile application topics associated with the mobile application, one or more text feedback topics;

generate, based on the one or more text feedback topics, one or more commands directing a sentiment analysis server to determine one or more sentiments for the one or more text feedback topics, wherein the generating the one or more commands directing the sentiment analysis server to determine the one or more text feedback topics comprises:

determining, based on performing sentiment analysis on a part of the text feedback associated with the one or more text feedback topics, the one or more sentiments for the one or more text feedback topics, wherein determining the one or more sentiments for the one or more text feedback topics comprises:

receiving a sentiment analysis model comprising past recorded user feedback data, and determining, based on a comparison between the sentiment analysis model and the part of the text feedback associated with the one or more text feedback topics, the one or more sentiments and one or more score probabilities associated with the one or more sentiments, and transmitting the one or more sentiments for the one or more text feedback topics;

transmit, via the communication interface and to the sentiment analysis server, the one or more commands directing the sentiment analysis server to determine the one or more sentiments;

receive, via the communication interface and from the sentiment analysis server, the one or more sentiments; and transmit, via the communication interface and to a summarization server, the one or more text feedback topics and the one or more sentiments.

17. The one or more non-transitory computer-readable media of claim 16, wherein the memory stores additional computer-readable instructions that, when executed by the at least one processor, cause the computing platform to:

modify, using a lemmatization analysis technique, the text feedback to generate cleansed text feedback; and wherein the one or more nouns associated with the text feedback is identified based on the cleansed text feedback.

18. The one or more non-transitory computer-readable media of claim 16, wherein the memory stores additional computer-readable instructions that, when executed by the at least one processor, cause the computing platform to:

receive, via the communication interface and from a mobile application dictionary server, the plurality of mobile application topics associated with the mobile application; and wherein the identifying the one or more text feedback topics is based on the one or more nouns matching one or more mobile application topics from the plurality of mobile application topics.

19. The one or more non-transitory computer-readable media of claim 18, wherein the memory stores additional computer-readable instructions that, when executed by the at least one processor, cause the computing platform to:

responsive to the one or more nouns not matching the plurality of mobile application topics, determine a frequency of user feedback associated with the one or more nouns and a time period associated with the one or more nouns; and identify, based on the frequency of user feedback and the time period, new mobile application topics associated with the mobile application.

20. The one or more non-transitory computer-readable media of claim 19, wherein the memory stores additional computer-readable instructions that, when executed by the at least one processor, cause the computing platform to:

modify the plurality of mobile application topics associated with the mobile application to include the new mobile application topics; and transmit, via the communication interface and to the mobile application dictionary server, the plurality of modified mobile application topics.

* * * * *